United States Patent

Nealon

[15] 3,695,034
[45] Oct. 3, 1972

[54] APPROACH COMPUTER FOR AIRCRAFT

[72] Inventor: Ivan W. Nealon, 364 Darrell Road, Hillsborough, Calif. 94010

[22] Filed: Nov. 19, 1970

[21] Appl. No.: 91,063

[52] U.S. Cl.............................58/152 R, 235/61 PS
[51] Int. Cl................................................G04b 47/06
[58] Field of Search.........58/152 R, 152 E; 116/129; 235/61 NV, 61 PS

[56] References Cited

UNITED STATES PATENTS

| | | | |
|---|---|---|---|
| 3,127,102 | 3/1964 | Fallis | 235/61 B |
| 3,220,643 | 11/1965 | Gorman | 235/61 NV |
| 3,117,312 | 1/1964 | Watson | 73/178 |

Primary Examiner—Richard B. Wilkinson
Assistant Examiner—Edith Simmons Jackmon
Attorney—Eckhoff and Hoppe

[57] ABSTRACT

An approach computer device is provided for an aircraft approaching a landing field to enable the pilot to have before him during the approach a device which shows the distance to the landing field and, correlated with that distance, the altitude at which the plane should be flying at such distance. The distance to be flown is set as the plane passes over the final approach fix from which the plane is to approach the field at a constant rate of speed. The device is calibrated to provide a constant rate of descent, such as 500 feet per minute.

7 Claims, 5 Drawing Figures

PATENTED OCT 3 1972 3.695,034

INVENTOR.
IVAN W. NEALON
BY
ATTORNEYS

INVENTOR.
IVAN W. NEALON
BY
ATTORNEYS

APPROACH COMPUTER FOR AIRCRAFT

BACKGROUND OF THE INVENTION

The approach phase of instrument flight is a relatively complex operation which requires the operation of many electronic and electromechanical pieces of equipment. Commercial airlines are usually thought of as being well equipped but many general aviation aircraft have a limited amount of equipment which results in greater demands being placed upon the pilot. Similarly, the major air carrier airports have a full complex of instrument facilities to assist aviation, but the lesser airports have varying amounts of navigational aids for instrument flight.

The best and most sophisticated instrument approach aid currently available is the ILS (Instrument Landing System). The ILS consists of a radio transmitter at the airport which, in effect, transmits two beams outward in the direction in which an airplane will approach. The aircraft receiving the signal has instrumentation which will indicate to the pilot both the direction in which he should fly in a horizontal plane and the glide slope he should fly in the vertical plane.

The problem is that many airports do not have ILS systems. In addition many aircraft have equipment for receiving the horizontal portion of the ILS, but not the glide slope portion. Other radio facilities such as ADF's (Automatic Direction Finders), marker beacons and commercial radio stations can also be used for instrument approaches, but all of these have a more limited accuracy and place greater demands on the pilot.

In the interest of safety, it is not desirable to rely on a single piece of equipment but to have various pieces of equipment capable of providing cross checks on the primary system. In this environment, the pilot needs all the help he can get. The approach computer of this invention is intended to reduce pilot workload and anxiety by serving as an additional navigational aid for the approach phase of a landing.

SUMMARY OF THE INVENTION

The approach computer of this invention is basically a timing device capable of measuring the time from a known position. However, rather than being calibrated in hours, minutes and seconds as in a clock, one dial is calibrated to indicate at any point in time the distance which remains to be travelled during the approach at a certain ground speed while another dial is calibrated to indicate at the same point in time the altitude at which the aircraft should be.

As a result, the pilot, having started the computer at a known position and having set in the field elevation, can read directly from the computer face the altitude at which the aircraft should be flying at any point during the approach. The timing device will show continuously the distance to destination and also the altitude at which the aircraft should be in units of measurement above sea level.

Any type of timing device can be used so long as it is made consistent with the scales to be used. The distance scale may be calibrated in statute miles, nautical miles, or kilometers and should be consistent with the airspeed indicator in the airplane. Similarly, the altitude scale can be calibrated in feet or meters and should be consistent with the altimeter in the aircraft.

The timer may have a fixed or variable rate. If a fixed rate timer is employed it will require that the pilot fly a specific ground speed consistent with the timer employed. If the timer rate is variable, then the aircraft ground speed and descent rate can be varied. The dials may also be interchanged with other dials having different ground speed and descent rates.

DESCRIPTION OF THE PREFERRED EMBODIMENT

Figure 1:
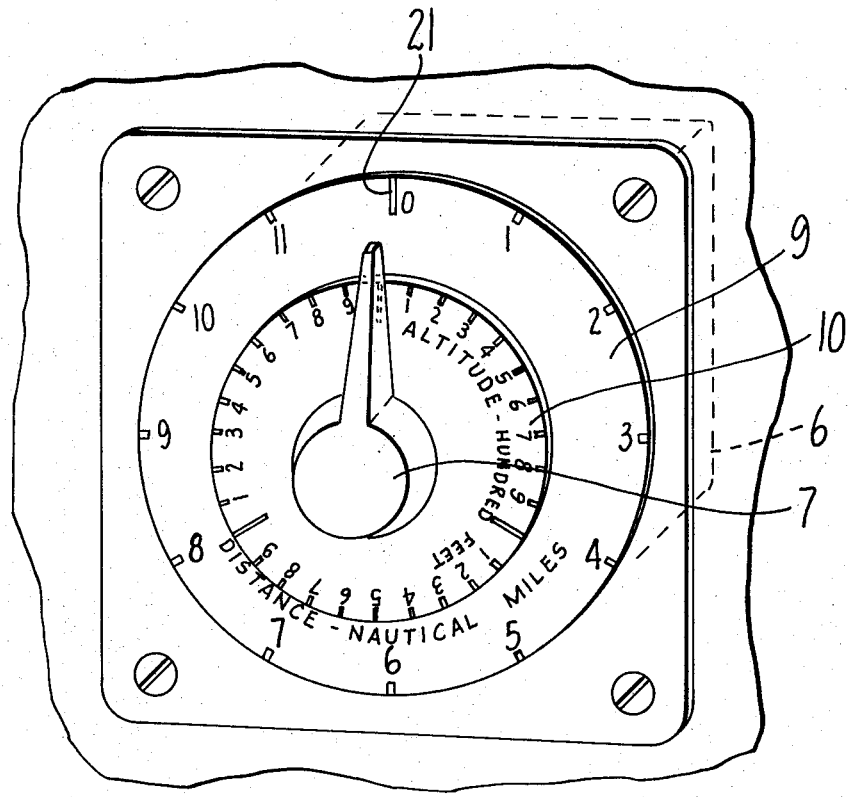
FIG. 1 is a plan view showing one arrangement of the approach computer dial arrangement.
Figure 2:
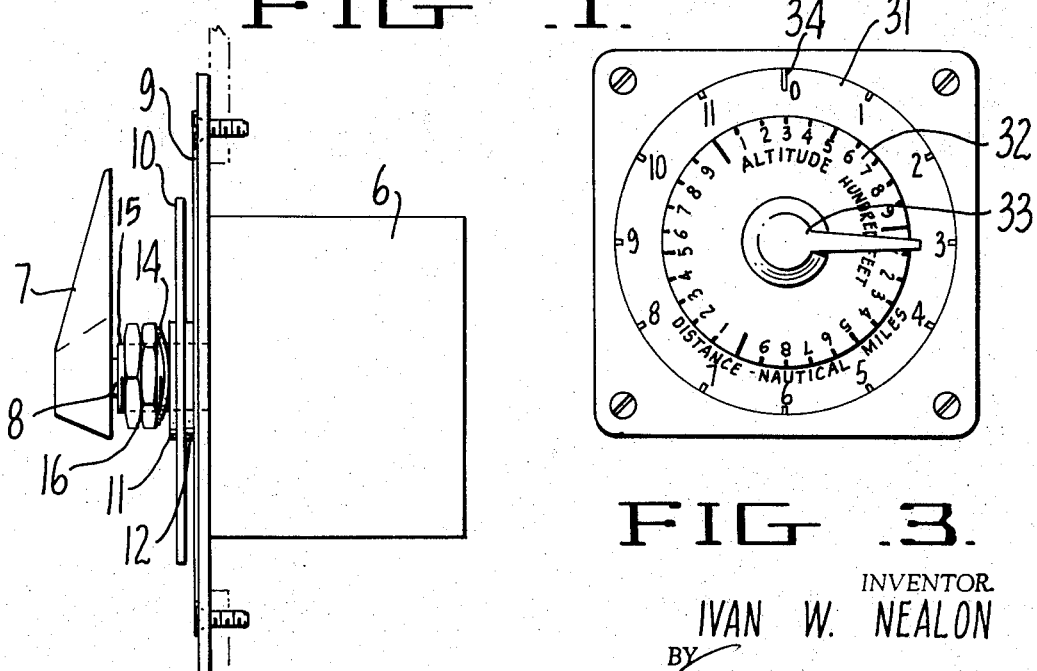
FIG. 2 is a side view of the device shown in FIG. 1.

Referring particularly to FIGS. 1 and 2, the approach computer of this invention includes a timing device, generally indicated at 6. The device includes a knob or pointer 7 mounted upon a shaft 8 which is rotated by the timing device in a counterclockwise direction in FIG. 1. A collar 15 is rotatably mounted on the shaft and provides a support for other elements of the device. The device includes a fixed outer dial 9 calibrated in nautical miles. In the form shown, the timing device has a total escapement time of 6 minutes. Mounted rotatably on the collar 15 is an inner rotatable dial 10 which is calibrated in hundreds of feet to indicate the altitude. Referring to FIG. 2, dial 10 is rotatably mounted on the collar 15 between washers 11 and 12 under the bias provided by spring friction washer 14. This assembly is held in place by a double lock nut assembly indicated at 16 and which are engaged with threads on the collar.

In use, the dial 10 is first rotated to indicate the elevation of the field at which the landing is to be achieved, this value being placed opposite the zero indicia 21 on the outer dial. As the aircraft passes over the initial approach point, the pointer 7 is manually rotated clockwise until it is opposite the distance in nautical miles from the destination. This energizes the timing device, causing the pointer to rotate counterclockwise. As the distance to the destination point diminishes, similarly the reading of altitude diminishes, this being usually established at 500 feet per minute. If the altitude reading is more or less than the altimeter reading, the pilot alters his rate of descent until the altimeter reading corresponds with the altitude indicated by the approach computer. In the form shown, the fixed dial 9 was based on a speed of 120 knots and this gives a total distance scale of 12 nautical miles. As the distance diminishes, so does the reading of the pointer over the altitude scale until finally, when the plane is at the destination point, the altitude will be that of the field at the destination point, at zero distance.

Figure 3:
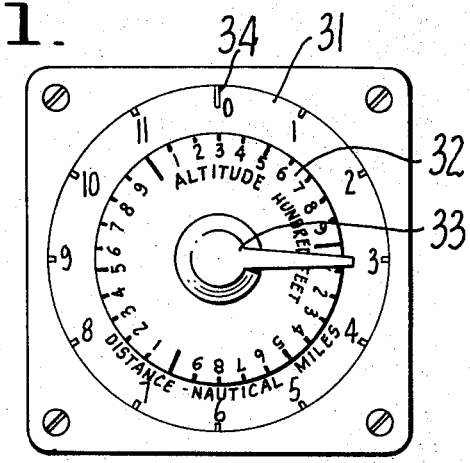
FIG. 3 is a plan view of the device in reduced scale, showing the device in use.

In that form of the invention shown in FIG. 3, the outside dial 31 is fixed. This dial is calibrated in distance from the destination point as in the form shown in FIG. 1. However, the inside dial 32 is fixed but is rotatable so that the field elevation can be set in against the index 34 provided upon the outer dial 31. The outer dial 31 is calibrated for distance. In operation, the pilot, having adjusted the altitude dial 32 for the field elevation, turns the knob pointer 33 to the distance locating the aircraft in relation to the landing field. The knob pointer 33 rotates counterclockwise and one can then read both altitude and distance by observing the position of the knob pointer in simultaneous relation to both dials.

Figure 4:
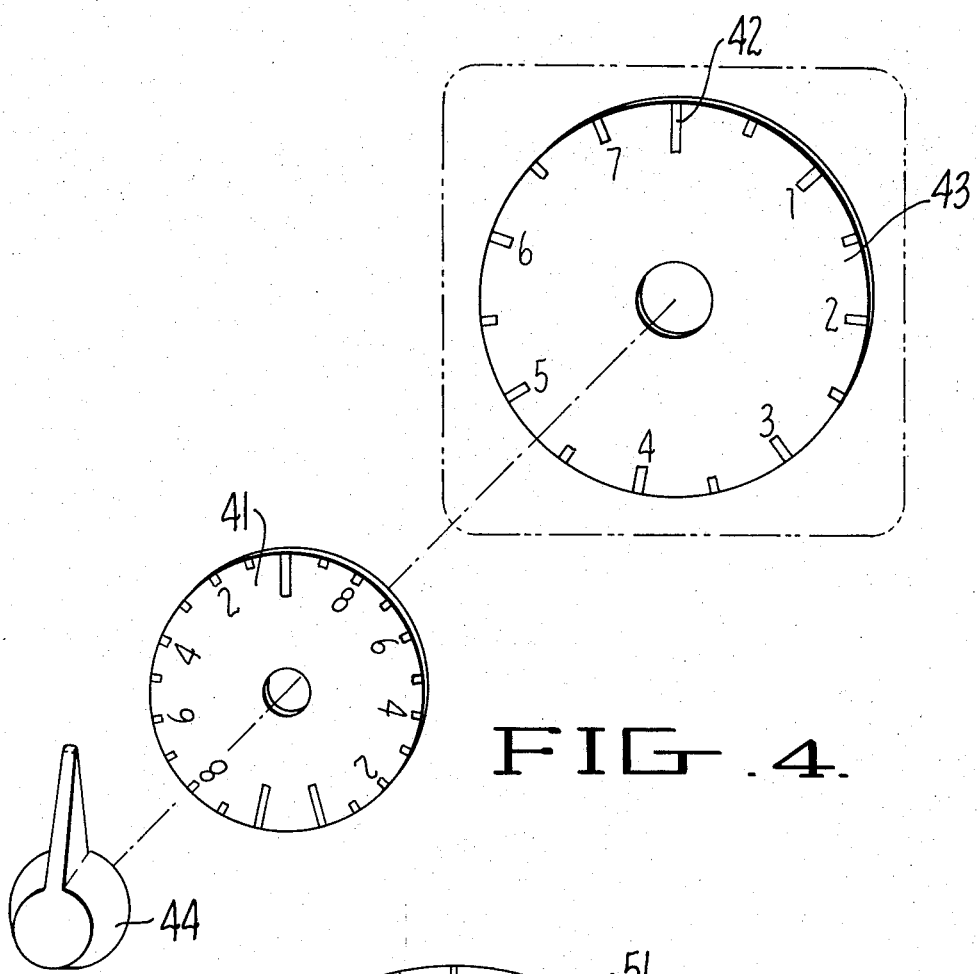
FIGS. 4 and 5 are, respectively, exploded and plan views showing other dial arrangements which can be employed in the approach computer device of this invention.

In that form of the invention shown in FIG. 4, the inner dial 41 is calibrated in hundreds of feet to show the altitude. This dial is mounted upon the knob and can be rotated with respect to the knob 44 for the purpose of setting in the field elevation prior to the approach. In this form of the invention, however, once inner dial 41 has been set in position to indicate the field elevation, the inner dial 41 rotates with the knob. The distance from the field is then read on the outside scale at the end of the knob pointer as the knob pointer rotates counterclockwise. The altitude information is read on the middle scale against the indicator 42 which is provided at the top of the outside scale at zero distance.

Figure 5:
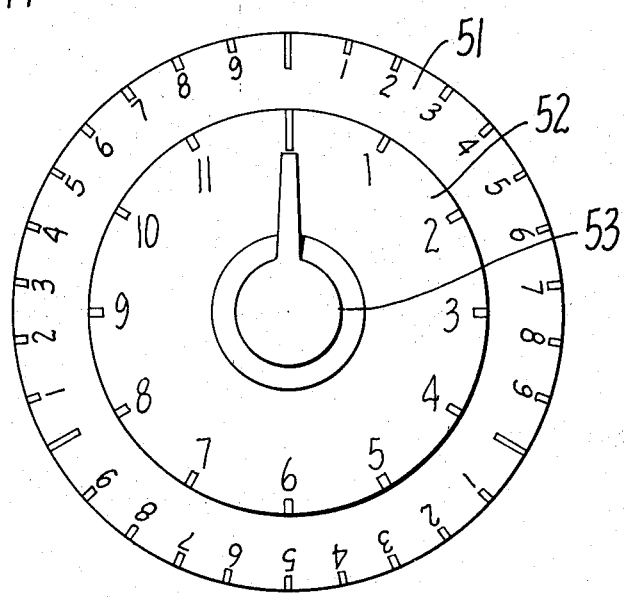

In that form of the invention shown in FIG. 5, the outer dial 51 is rotatable on a supporting shaft and is calibrated in units of elevation. The inner dial 52 is calibrated in units of distance. With the two dials fixed initially at the distance from the landing place and with field elevation set in, the pointer 53 indicates the desired elevation at the attained distance at any interval of elapsed time.

In another form of the invention, the outer dial is calibrated to show the altitude while the inner dial is attached to the knob and is calibrated in distance. The outer dial is rotatable on the collar 15 to set the field elevation opposite the 0 distance index of the inner dial. The inner dial rotates with the knob timer and the altitude is read from the pointer and the distance is read at a fixed distance index on the dial.

I claim:

1. A computer for use in aircraft for correlating the distance to be travelled by an aircraft moving at a predetermined speed from a fixed point on an approach to a landing field with the altitude to be maintained by the aircraft during the approach to the field, comprising a clock mechanism having a face, a shaft extending from the clock mechanism through the face thereof and rotatable by said clock mechanism, a pair of dials each having a different diameter and mounted concentrically about said shaft at said face, one of said dials having suitable indicia thereon for indicating the distance to be travelled and the other of said dials having suitable indicia thereon to indicate the altitude to be maintained, said dials being mounted for relative rotation of one to the other, a pointer mounted on said shaft for rotation therewith and movable with respect to at least one of said dials, and one of said dials being movable relative to a reference mark on the other dial to indicate the altitude of the landing field, so that the distance to be travelled and the altitude to be maintained can be correlated one to the other.

2. A computer as in claim 1, wherein said one dial with distance indicia thereon is larger in diameter than the other dial and is fixed to the face of the clock mechanism.

3. A computer as in claim 2, wherein the pointer is movable relative to both dials to give an indication of both the altitude to be maintained and the distance to be travelled.

4. A computer as in claim 2, wherein said other dial with altitude indicia thereon is connected to move with said pointer.

5. A computer as in claim 1, wherein said other dial with altitude indicia thereon is larger in diameter than said one dial and is rotatably mounted about said shaft on the face of said clock mechanism.

6. A computer as in claim 5, wherein said pointer is movable relative to both dials to give an indication of both the altitude to be maintained and the distance to be travelled.

7. A computer as in claim 5, wherein said one dial with distance indicia thereon is connected to move with said pointer.

* * * * *

Notice of Adverse Decision in Interference

In Interference No. 98,320, involving Patent No. 3,695,034, I. W. Nealon, APPROACH COMPUTER FOR AIRCRAFT, final judgment adverse to the patentee was rendered May 21, 1976, as to claims 1, 5 and 6.

[*Official Gazette November 30, 1976.*]